Mar. 27, 1923.

J. L. ANDERSON.
WELDING APPARATUS.
FILED DEC. 31, 1919.

INVENTOR
James L. Anderson
BY
ATTORNEY

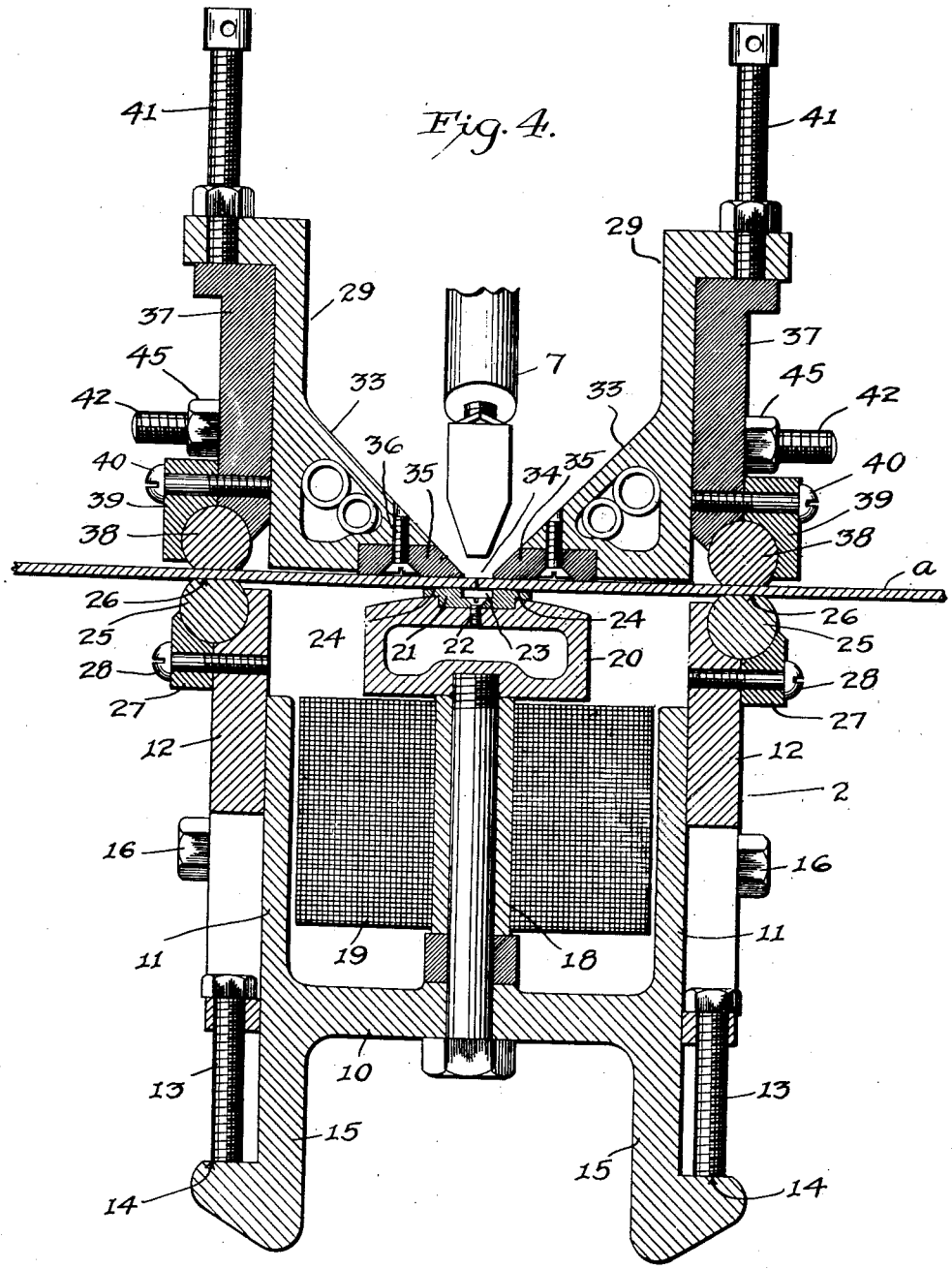

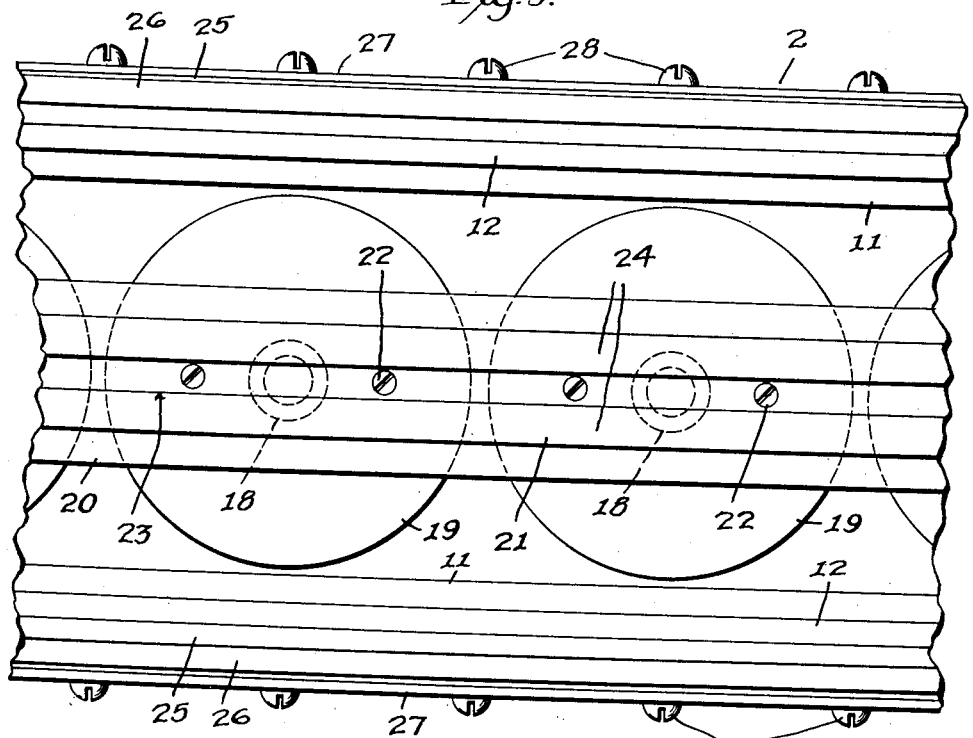
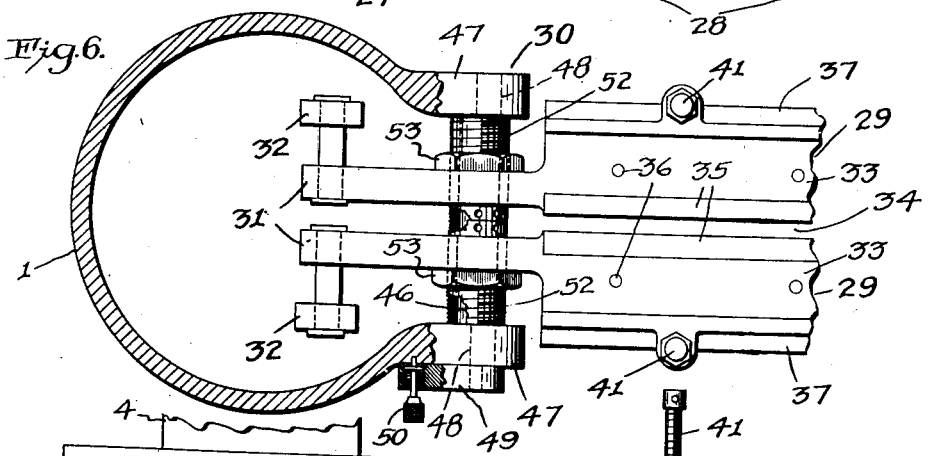
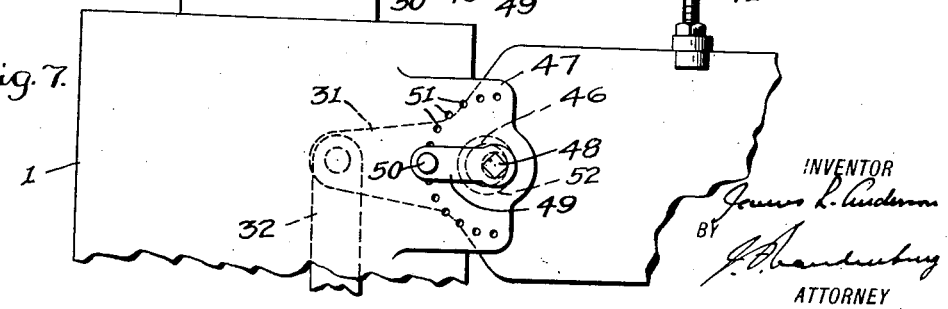

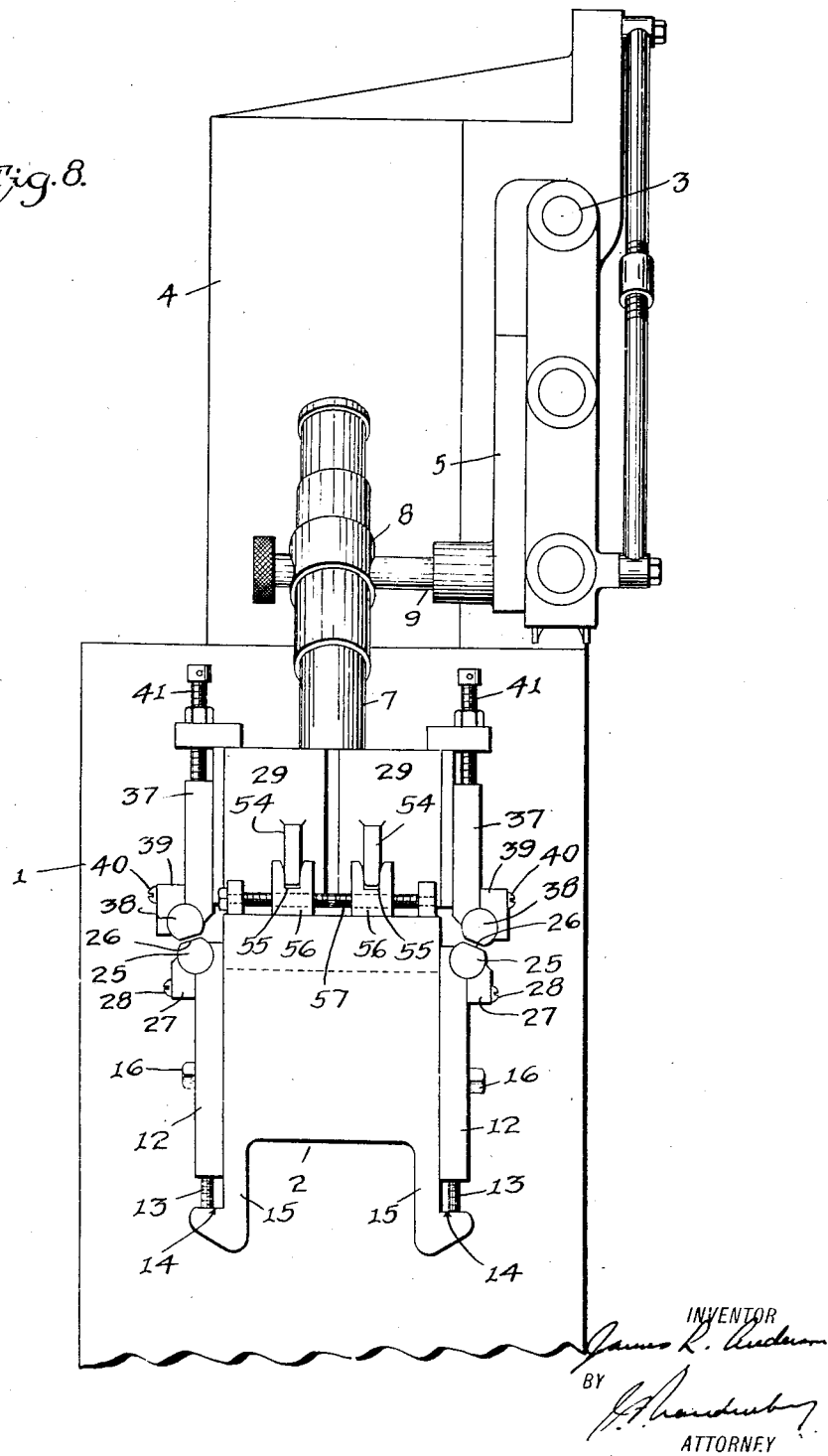

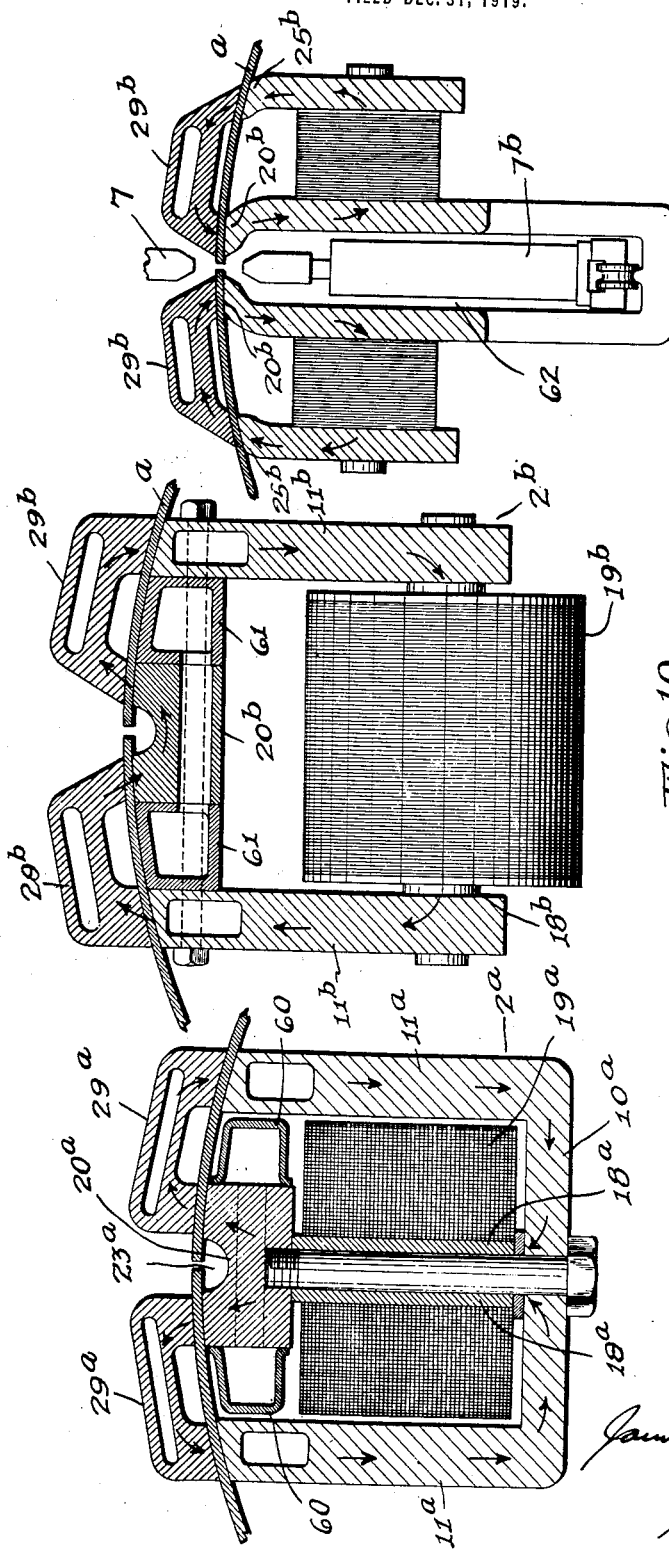

Patented Mar. 27, 1923.

1,449,369

UNITED STATES PATENT OFFICE.

JAMES L. ANDERSON, OF BAYONNE, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

WELDING APPARATUS.

Application filed December 31, 1919. Serial No. 348,652.

*To all whom it may concern:*

Be it known that I, JAMES L. ANDERSON, a citizen of the United States, and resident of Bayonne, in the county of Hudson and State of New Jersey, have invented a new and useful Welding Apparatus, of which the following is a specification.

The invention relates to machines for butt-welding seams autogenously or by fusion, as with the oxy-acetylene flame, and has for its object to provide improved means for holding the sheets with their edges in relation to be fused by the torch or welder. By sheets are meant metal barrel bodies and other tubular bodies, consisting of single sheets curved into tubular form, the longitudinal edges of which are to be united, separate flat or curved sheets or plates, or prismatic bodies having rectilinear seams; and one of the objects is to provide means adaptable for holding sheets or bodies of different degrees of curvature, ranging from the flat to a comparatively short radius of curvature. More particularly the object is to provide means whereby the sheets or portions to be united are held efficiently by electromagnetic clamping action. The forces acting in the metal while being welded by the flame fusion process are severe, and in mechanical welding of the character indicated wherein the torch, or the work, is set in motion and driven the length of the seam at definite speed, and wherein the penetration, continuity and uniformity of the union depend upon the maintenance of substantially exact conditions, it has been very difficult to restrain the edges against unintended movement. A certain amount of self-adjustment of the sheet portions transverse to the center line of the seam may be permissible and desirable, and the invention is not necessarily intended to prevent all such movement in the plane of the work; but the purpose is to afford an exceedingly powerful and readily applicable and releasable clamping action, which effectively controls, and if necessary absolutely holds, the sheets and positively prevents any misalinement or overlapping of the edges.

The invention comprises broadly the combination of one or more electromagnets and armatures arranged as a support beneath and separated clamping means above, to grip the sheet metal parts while exposing the seam, the lines of force passing through the magnetic sheet material between the magnet poles at one side and the armatures at the other. The form herein illustrated, and to which the present application is specifically directed, is designed for holding comparatively large bodies and sheets, and may be described generally as an elongated support consisting essentially of an electromagnet, having central and lateral pole pieces adapted to contact with the under side of the sheets, and separated clamp arms on top forming armatures to bridge the pole pieces and close the magnetic circuit, which passes through the interposed sheets, and which in this instance is divided. Certain modifications are also illustrated, in one of which the lateral pole pieces are of opposite polarity, instead of like polarity, and the place of the central pole piece is occupied by a stationary armature section; while in another, two magnets are employed, permitting a lower torch to operate in the space between them, in order to weld from opposite sides.

An important part of the invention relates to movability of the gripping portions, whereby by vertical or vertical and lateral adjustments, the machine is made universal, so as to operate on various curvatures, including the flat. This is still better accomplished by providing the adjustable gripping portions with swiveled contact pieces, affording gripping faces of suitable width, the angle of which can change. Means are also provided for adjusting the clamp arms so that the slot between them can be varied, which is important for different thicknesses of metal. The central contact or gripping portion of the support is likewise made movable, as by being removable and replaceable by others, in order that the width of its central gap or groove may also be adjusted for differences in gage. The clamp arms are laterally supported at their free ends by guides, which are laterally adjustable on the support. The central pole piece or armature section, with or without shield extensions, hollow for water cooling, is arranged to protect the coil of the magnet from the heat of the torch.

These and other features of the invention will become apparent as the specification proceeds.

In the drawings forming a part hereof:

Fig. 4 is a vertical cross-section showing the holding means adjusted for flat work;

Fig. 5 is a fragmentary plan view of the electromagnetic support, on still a larger scale;

Fig. 6 is a horizontal sectional plan at the hinge region of the clamping arms;

Fig. 7 is a side elevation of Fig. 6;

Fig. 8 is an end elevation;

Fig. 9 is a vertical cross-section through a simplified form of the holding means;

Fig. 10 is a similar view of a modified construction; and

Fig. 11 is a similar view of still another modification.

Figure 1:
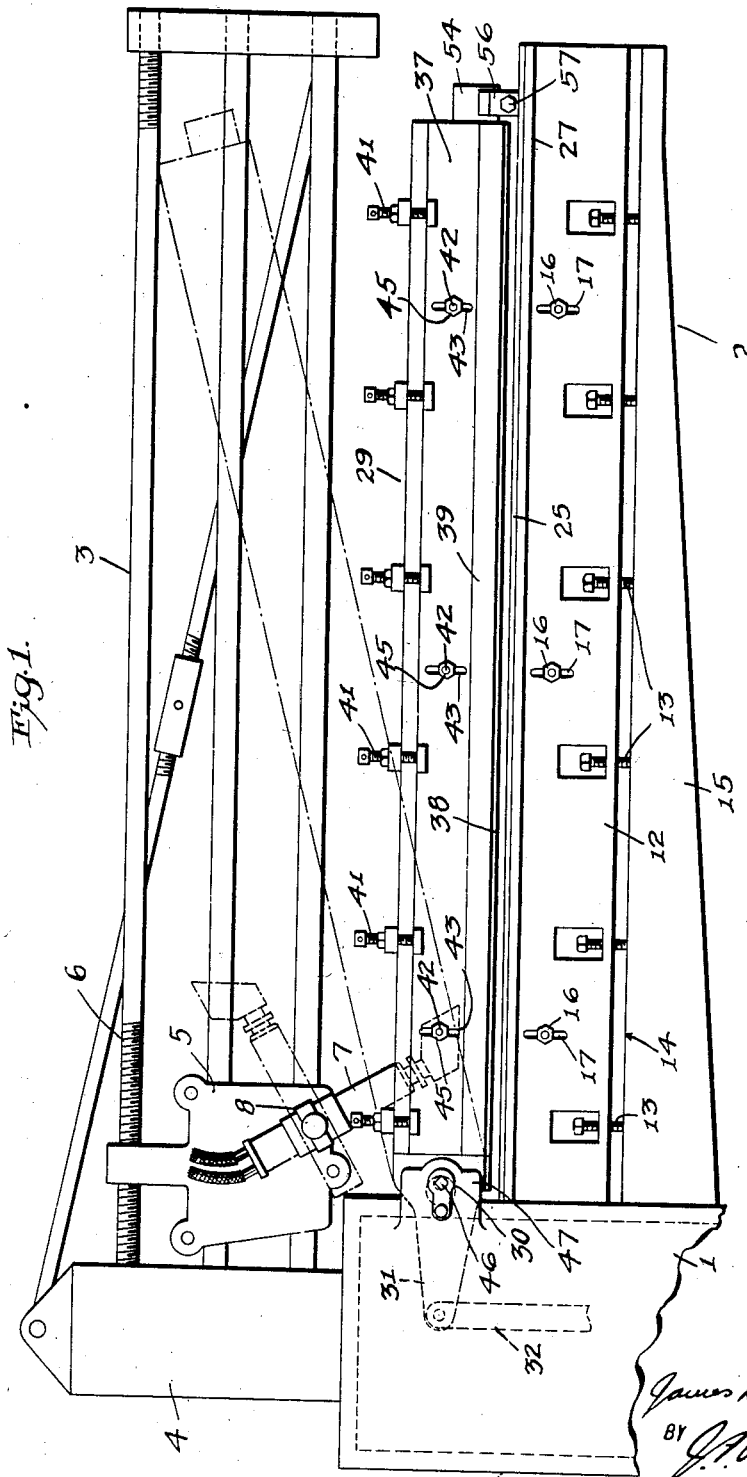
Fig. 1 is a side elevation of a machine embodying the invention, the lower part of the standard being broken away.

The machine is shown as having a suitable supporting standard 1, from which projects an overhanging arm 2, constituting a support for the work. Another arm 3 extends from the upper part 4 of the standard, parallel with the arm 2, and in a vertical plane laterally offset therefrom. The arm 3 forms a supporting guide for a torch carriage 5, which is movable longitudinally on the guide by power driving mechanism represented by a screw 6. An oxyacetylene or like welding torch 7 is mounted on the carriage in a holder 8, which is carried on a laterally projecting pivot 9 on the carriage, whereby it is disposed over the longitudinal center of the arm 2 and can be thrown up out of the way, as indicated by dotted lines in Fig. 1.

The work-supporting arm 2 consists essentially of an elongated trough-like magnet frame having a bottom wall 10 and side walls 11. On the outer sides of the side walls are plates 12, which can be raised and lowered. These plates constitute the bodies of extension pole pieces, and in the simple construction illustrated are adjustable by means of screws 13 acting upon ledges 14 on bottom ribs 15, and held in magnetic contact with the frame at the desired vertical adjustment by other screws 16 passing through slots 17 in the plates.

Along the middle of the interior of the magnet frame are one or more upright cores 18 surrounded by one or more energizing coils 19. It will be obvious that there may either be a single core extending lengthwise of the magnet and bearing a single coil, or else, as shown, separate cores with separate coils. At the top the cores bear a central pole piece 20. In this construction it will be understood that the lateral pole pieces are of like polarity while the central pole is of the opposite sign, and that consequently there is a double magnetic circuit. The central pole piece 20 extends continuously over the tops of the cores, to which it is connected, and may be made sufficiently broad, as illustrated, to constitute a shield for the coils, to protect them from the heat of welding. The member is made hollow, as shown, for circulation of cooling fluid. The top of the central pole piece is formed with a central longitudinal groove, in which a detachable contact piece 21 is secured by screws 22. This contact piece has a longitudinal groove 23 in the top, at opposite sides of which are longitudinal surfaces 24, of suitable width, designed to contact with the under sides of the sheets or tubular body $a$ adjacent the center line of the seam.

Figure 2:
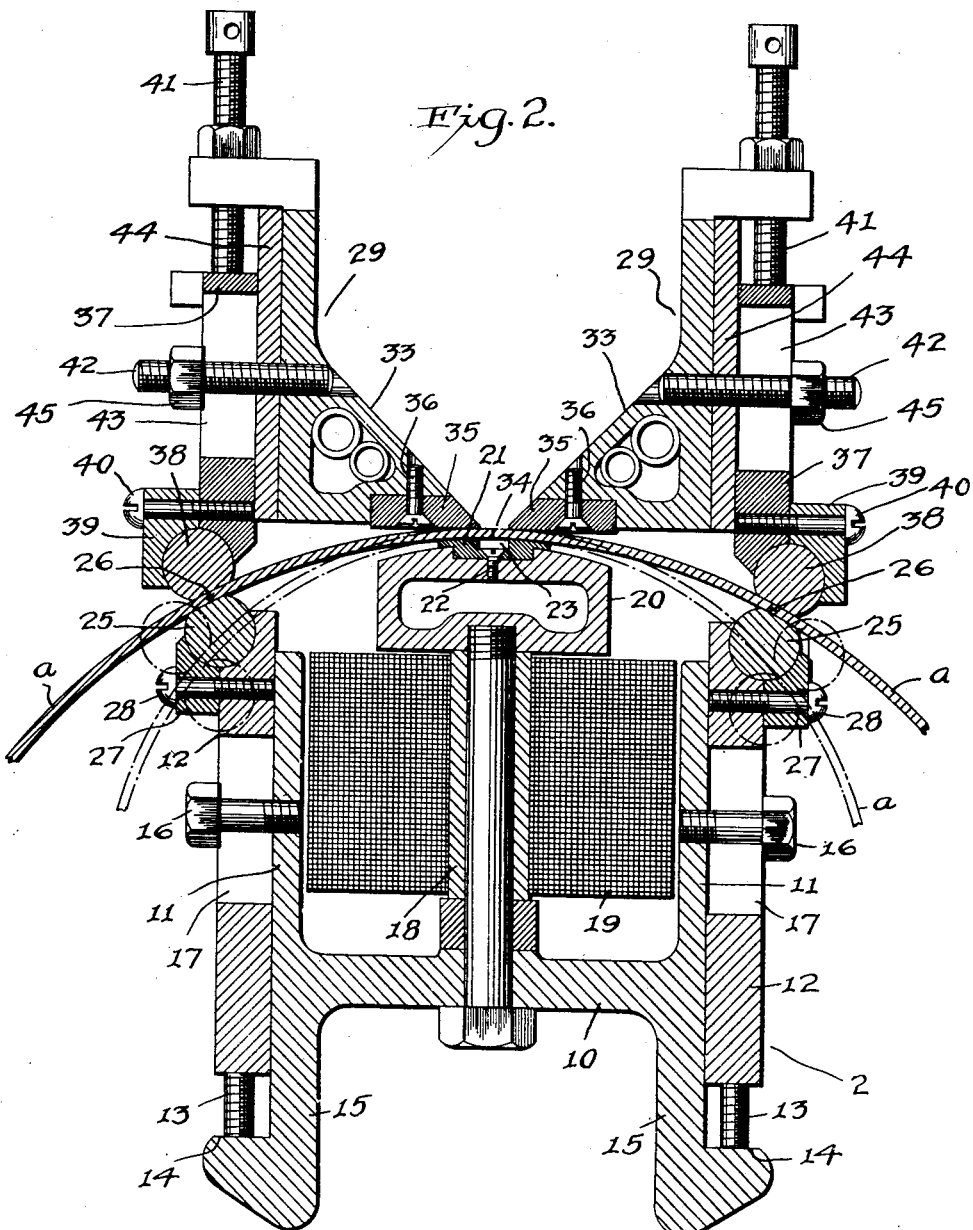
Fig. 2 is an enlarged vertical cross-section through the holding means, indicating in full and dotted lines two adjustments for curvature.
Figure 3:
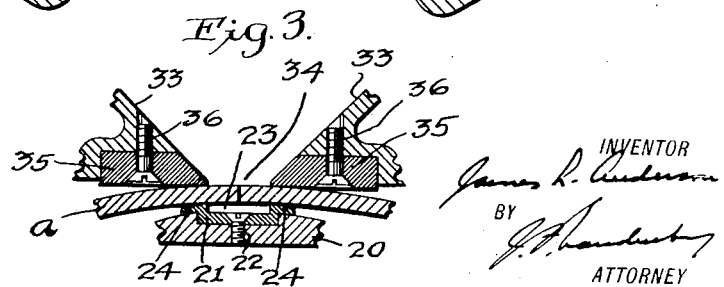
Fig. 3 is a fragmentary view showing an adjustment for the gage.

The sheets are supported outwardly from the center by swiveled or angularly movable contact pieces 25 carried at the upper edges of the extension pole piece plates 12. Said lateral contact pieces 25 are advantageously formed as cylindrical rods having a flat or slightly curved face 26 slabbed off at one side of each. The round body of each rod is held in a corresponding socket, including somewhat more than half its circumference, which is formed partly in the upper outer portion of the corresponding plate 12 and partly in a retaining strip 27 secured to the plate by screws 28. The parts are of magnetic material and the slabbed surfaces 26 of the rods constitute the outer pole faces of the magnet. The contact pieces 25 are free to turn in their sockets, and will consequently adjust themselves to different curvatures of sheets and plates, from the flat condition illustrated in Fig. 4 to the relatively small radius of curvature indicated by dotted lines in Fig. 2. Manifestly the rods 25 can either extend in one piece the length of the support or be made in sections, as preferred.

Two sufficiently massive clamp arms 29 of magnetic material extend longitudinally over the magnet. At their rear ends they are supported on a transverse hinge 30 illustrated in Figs. 6 and 7, which permits them to be raised for insertion and removal of the work between them and the magnet support. As indicated, the arms may have rearward extensions 31 connected with links 32 extending downwardly within the standard to connect with a pedal or other means, not shown, for raising and lowering the arms when desired.

The arms are preferably made comparatively deep, as shown, and are provided at the inner side towards the bottom with inwardly and downwardly beveled portions 33, the edges of which define the sides of a slot or gap 34 of predetermined width, by which the open seam and a narrow strip of the sheets at opposite sides thereof are exposed to the action of the torch. The portions 35 which define the slot are preferably removable, being held in bottom recesses in the beveled body portions 33 by means of screws 36. The upper inner edges of these removable and replaceable pieces 35 are beveled in continuity with the bevel of the parts 33, and their under surfaces are adapted to bear upon the top of the sheets in opposition to the supporting surfaces 24 beneath. The portions 33 of the arms are made hollow for water-cooling.

On the outer side of each of the arms 29 are plates 37, which carry lateral swiveled gripping members 38 at the bottom, similar to the gripping members 25 on the magnet frame work-support. The members 38 are held with capacity for angular self adjustment in the same manner as the members 25, their retaining strips and screws being numbered 39 and 40, respectively. The plates 37 are vertically adjustable on the arms and held at the desired adjustment by means of vertical and horizontal screws 41 and 42, the latter passing through vertical slots 43 in the plates. One set of gripping members, preferably the upper, is also made laterally adjustable with reference to the other. This can be conveniently accomplished by inserting filler plates 44 of different widths between the plates 37 and the arms, the nuts 45 occupying positions further in or out on the screws or bolts 42, according to the thickness of the inserts. By reference to Figs. 2 and 4, it will be seen that by means of the vertical and horizontal adjustments of the lateral gripping or contact members the machine can be made available for welding sheets or parts of any desired curvature, the adjustments being such as to bring the slabbed faces of the swiveled members 25 and 38 substantially opposite each other in any condition within the range of the machine.

The arms themselves, and with them the upper gripping members 38, are also laterally adjustable upon the hinge 30, in order to vary the width of the welding slot 34 between the adjacent inner and lower edges of the arms. When such an adjustment is made for a different thickness of work, it will be necessary to shift the gripping members 38 laterally on the arms if the curvature is to remain the same; and this can be accomplished by means of the screws and nuts 42, 45 and filler plates 44. Provision is likewise made at the hinge for effecting precise vertical adjustment of the pivotal axis, in order that the arms may lie flat and be held against the sheets by magnetic attraction with substantially uniform force throughout their length, whatever the thickness of sheets being welded. These adjustments of the arms can be conveniently effected by the construction shown in Figs. 6 and 7, wherein a pivot shaft 46 is seen extending between lugs 47 on the standard 1, in which its ends 48 are eccentrically journaled. One of these eccentrically journaled ends bears an exterior arm 49 having a spring-locking pin 50 adapted to cooperate with an arcuate series of sockets 51 in one of the lugs, thereby holding the body of the shaft at different closely graduated heights. Two externally-threaded sleeves 52 are independently rotatable on the shaft 46 in end abutment with each other and the inner sides of the lugs 47. The screw-threads of these sleeves engage screw-threads in transverse openings in the rearward extensions 31 of the arms, and consequently the arms can be moved laterally by turning the sleeves inside them, as by means of a spanner. The desired adjustment is locked by means of nuts 53.

When the arms are adjusted laterally, the central gripping surfaces on the bottoms of the pieces 35 are correspondingly shifted, and it becomes necessary to provide a lateral adjustment for the lower central gripping surfaces, both in order to keep them opposite the upper surfaces and in order to vary the width of the groove 23. This is most conveniently accomplished by providing a plurality of the members 21, any one of which can be set into the groove in the top of the pole piece 20, these members having their contact surfaces nearer together or farther apart and the groove between them being wider or narrower, according to the adjustments desired. The free ends of the arms have forwardly projecting lugs 54, which when the arms are lowered enter guide slots 55 in blocks 56 on the support 2. These blocks are laterally adjustable by means of a right- and left-hand threaded screw 57, in order to position them in accordance with the lateral adjustment of the arms. The blocks and lugs thus sustain the arms against lateral displacement and hold the edges of the welding slot 34 parallel.

In the use of the machine the clamp arms are raised, the magnet being de-energized, and the cooperating upper and lower gripping surfaces are adjusted to a level, if plane sheets are to be welded, or to suitable relative positions vertically and horizontally if the work is in the nature of curved sheets or tubular bodies. The sheets are then laid upon the central and lateral supporting surfaces of the magnet support, or, in the case of a tubular body, the body is inserted over the arm, and the longitudinal edges to be united are disposed in the desired position.
The clamping arms are now lowered until they rest upon the work, in opposition to the supporting surfaces beneath. At this time the work is not clamped. The magnet is then energized by operating a switch, not shown, which causes current to flow through the coil or coils 19. At once the arms are clamped down upon the work with great force. The torch, being properly adjusted, is lighted and set in motion at the appropriate speed and caused to travel from one end of the seam to the other, fusing the edges together. During this operation the magnetic clamping means holds the sheets against all undesired movement, thus insuring a successful weld.

Fig. 9 is a cross-section of a simplified form of the work-holder, built for one or a limited range of curvatures, the adjustments of the gripping portions being dispensed with. Similar parts are designated with like numerals of reference, with super-character "a". Supplementary shields 60, hollow for water-cooling are shown at the sides of the central pole pieces 20ª. The divided magnetic circuit is represented by the arrows.

Fig. 10 illustrates a modification in which the central supporting member 20ᵇ is not a pole piece, but a stationary armature section supported from the sides 11ᵇ of the magnet frame by members 61 of non-magnetic material. The magnet frame 2ᵇ in this instance is open at the bottom, and the core or cores 18ᵇ of the coils 19ᵇ are horizontal. The tops of the sides 11ᵇ are thus of opposite polarity instead of the same polarity, as in the preceding forms, and there is a single magnetic circuit which flows as indicated by the arrows from one of the lateral poles to and transversely through one of the arms 29ᵇ to the central support 20ᵇ, to the other arm, and thence to the other lateral pole.

In Fig. 11 there are two magnets, or a double united magnet, constituting the work support, a longitudinal passageway 62 being arranged between the magnets beneath the work, to accommodate a lower torch 7ᵇ, which is suitably guided and driven in unison with the upper torch 7, after the general manner of Patents 1,091,479 of March 31, 1914 and 1,118,327 of November 24, 1914, so that the seam is welded simultaneously from both sides. Each of the twin magnets is on the order of the magnet of Fig. 10, that is to say having only two dissimilar poles. The magnets are arranged with like poles 20ᵇ adjacent each other at the center, and like poles 25ᵇ at the outer sides. The inner poles 20ᵇ with a slot between them and formed on top with suitable contact surfaces, take the place of the pole piece 20 of Figs. 1 to 9 with its channeled, twin contact piece 21. Each of the arms 29ᵇ bridges the two poles of one of the magnets or magnet halves.

What I claim as new is:

1. In welding apparatus, means for holding sheet metal parts with their edges in relation to be fused by the welder, comprising one or more electromagnets and armatures, constituted as a support beneath the work and separated clamping arms above, to grip the parts to be united while exposing the seam, the lines of force passing through the work between the magnet poles at one side and the armatures at the other.

2. In welding apparatus, means for holding sheet metal parts with their edges in relation to be fused by the welder, comprising an electromagnet support and movable clamps of magnetic material held by the attraction of the magnet acting through the work to clamp the work to the magnet support at opposite sides of the seam.

3. In a welding machine, means for holding sheets with their edges in relation to be fused, comprising an electromagnet support, and movably mounted arms of magnetic material separated to expose the seam to the action of the welder and cooperative with the support to grip the sheets by magnetic clamping action.

4. In a welding machine, means for holding sheets with their edges in relation to be fused, comprising an electromagnet support having polar surfaces at opposite sides of the center to contact with the under sides of the sheets, and movable arms of magnetic material separated to expose the seam to the action of the welder and cooperative with said polar surfaces to grip the sheets between them by magnetic clamping action.

5. In a welding machine, means for holding sheets with their edges in relation to be fused, comprising a support having central and lateral supporting portions of magnetic material, clamping arms of magnetic material laterally separated to expose the seam to the action of the welder and formed to bridge the central and lateral supports, and energizing means, the whole organized to cause a closed magnetic circuit or circuits to pass through the support and arms and across the sheets between them to clamp the sheets.

6. Means for holding sheets with their edges in relation to be fused by a welder, having a support comprising an electromagnet with central and lateral poles adapted to contact with the under side of the sheets, and separated armature arms formed to bridge said poles and clamp the sheets against them.

7. In welding apparatus, means for holding sheets with their edges in relation to be fused, comprising a support having central and lateral supporting portions of magnetic material, the central supporting portion presenting supporting surfaces separated by a central gap, separated clamping arms of magnetic material formed to bridge the central and lateral supporting portions at each side and having surfaces to cooperate with the surfaces thereof to grip the sheets by magnetic clamping action, and energizing means, the whole organized to cause a closed magnetic clamping circuit or circuits to pass through the support and arms and across the sheets between them.

8. In welding apparatus, means for holding sheets with their edges in relation to be fused, comprising an electromagnet constituting a support beneath the sheets and having central and lateral poles, the central pole having a central groove, and clamping arms movably mounted over the support to bridge the central and lateral poles, whereby the sheets are held by magnetic clamping action between the arms and poles adjacent the seam and outwardly therefrom.

9. In welding apparatus, means for holding sheets with their edges in relation to be fused, comprising a support having central and lateral gripping portions of magnetic material adapted to contact with the under sides of the sheets, clamping arms of magnetic material formed to bridge said central and lateral gripping portions at each side and having gripping portions to cooperate, therewith, and energizing means adapted to cause a closed magnetic circuit or circuits to pass through the support and arms and across the sheets between the gripping portions, the lateral gripping portions being adjustable for different curvatures.

10. Electromagnetic means for holding sheets with their edges in relation to be fused by a welder, comprising a support having gripping portions adjacent the center and outwardly therefrom, separated clamps each having gripping portions cooperating with a central and lateral gripping portion of the support, means whereby the lateral gripping portions are vertically and laterally adjustable, and energizing means whereby magnetic lines of force pass through the sheets from one gripping portion to another to hold the work.

11. Electromagnetic means for holding sheets with their edges in relation to be fused by a welder, comprising an electromagnet support having a central supporting portion and lateral supporting portions constituting poles vertically adjustable on the frame of the magnet, separated armature arms adapted to bridge said central and lateral portions of the support at each side and to grip the sheets therewith by magnetic clamping action, said arms having lateral gripping portions which are also vertically adjustable thereon, and one set of lateral portions being also laterally adjustable.

12. Electromagnetic means for holding sheets with their edges in relation to be fused by a welder, comprising an electromagnet support having a central supporting portion and lateral supporting portions constituting poles vertically adjustable on the frame of the magnet, separated armature arms adapted to bridge said central and lateral portions of the support at each side and to grip the sheets therewith by magnetic clamping action, said arms having lateral gripping portions which are also vertically adjustable thereon, one set of lateral portions being also laterally adjustable, and means whereby the arms are also bodily adjustable with reference to each other to vary the gap between them.

13. Electromagnetic means for holding sheets with their edges in relation to be fused by a welder, comprising an elongated electromagnet support, separated longitudinal clamping arms of magnetic material cooperative with the support to hold the sheets between them by magnetic clamping action, means hinging the arms at the rear to swing up and down, and means for varying the height of the hinge, relative to the support so as to equalize the magnetic pull lengthwise of the arms with different thicknesses of metal.

14. Electromagnetic means for holding sheets with their edges in relation to be fused by a welder, comprising an electromagnet support having laterally-spaced movable pole pieces, and clamping arms having gripping portions movable thereon to cooperate with said movable pole pieces to hold sheets of different curvature by magnetic clamping action.

15. Electromagnetic means for holding sheets with their edges in relation to be fused by a welder, comprising an electromagnet support having laterally-spaced movable pole pieces, and clamping arms having gripping portions movable thereon to cooperate with said movable pole pieces to hold sheets of different curvature by magnetic clamping action, said pole pieces and gripping portions containing swiveled contacts.

16. Electromagnetic means for holding sheets with their edges in relation to be fused by a welder, comprising an electromagnet support having laterally spaced pole pieces, and separated clamping arms having gripping portions cooperative with said pole pieces, said pole pieces and gripping portions being adjustable vertically and also laterally with respect to each other and the support and arms.

17. Electromagnetic means for holding sheets with their edges in relation to be fused by a welder, comprising a support having an elongated magnet frame containing an energizing coil or coils, extension pole pieces movable on the sides of the frame, and a central supporting portion, in combination with separated clamping arms adapted to bear upon said central portion and having movable side portions cooperative with said extension pole pieces.

18. Electromagnetic means for holding sheets with their edges in relation to be fused by a welder, comprising an electromagnet support having central and lateral supports of magnetic material to contact with the under surfaces of the sheets, said central support having a contact portion presenting two spaced contact surfaces with an intervening gap, and separated clamping arms of magnetic material having central and lateral gripping portions cooperative with said supports to hold the sheets between them by magnetic clamping action.

19. Electromagnetic means for holding sheets with their edges in relation to be fused by a welder, comprising an elongated magnet frame having lateral poles of like polarity and a central pole of opposite polarity and containing an energizing coil or coils about central upright cores, and separated clamping arms of magnetic material having central and lateral gripping portions cooperative with said poles to form armatures bridging the same to hold the sheets by magnetic clamping action.

20. Electromagnetic means for holding sheets with their edges in relation to be fused by a welder, comprising an elongated magnet frame having lateral poles of like polarity, a central upright core or cores and surrounding energizing coil or coils, and a central pole piece hollow for circulation of cooling fluid and laterally extended to protect the coil from heat, in combination with armature arms adapted to cooperate with the central and lateral poles of the magnet frame to clamp the work between them.

21. Electromagnetic means for holding sheets with their edges in relation to be fused by a welder, comprising an elongated magnet frame having lateral pole pieces of similar polarity adapted to contact with the under surfaces of the sheets, a central upright core or cores and surrounding energizing coil or coils, and means over the tops of the cores comprising a central pole piece, and a shield for the coils, and separated armature arms adapted to bridge the central and lateral pole pieces and cooperative therewith to hold the sheets by magnetic clamping action.

22. Means for holding sheets of different curvature with their edges in relation to be fused by a welder, comprising a support having central and lateral gripping portions to contact with the under sides of the sheets, and clamping arms over the support separated to expose the seam and having central and lateral gripping portions cooperative with the portions of the support, the lateral portions being vertically adjustable on the support and arms.

23. Means for holding sheets of different curvature with their edges in relation to be fused by a welder, comprising a support having central and lateral gripping portions to contact with the under sides of the sheets, clamping arms over the support separated to expose the seam and having central and lateral gripping portions cooperative with the portions of the support, and means whereby the lateral and central gripping portions are relatively adjustable vertically.

24. Means for holding sheets of different curvature with their edges in relation to be fused by a welder, comprising a support having central and lateral gripping portions to contact with the under sides of the sheets, and clamping arms over the support separated to expose the seam and having central and lateral gripping portions cooperative with the portions of the support, the lateral gripping portions being vertically adjustable on the support and arms and one or both sets being also laterally adjustable.

25. Means for holding sheets of different curvature with their edges in relation to be fused by a welder, comprising a support having central and lateral gripping portions to contact with the under sides of the sheets, clamping arms over the support separated to expose the seam and having central and lateral gripping portions cooperative with the portions of the support, and means whereby the lateral and central gripping portions are relatively adjustable vertically, the lateral portions containing swiveled contact pieces.

26. Means for holding sheets of different curvature with their edges in relation to be fused by a welder, comprising a support having central and lateral gripping portions to contact with the under sides of the sheets, and clamping arms over the support separated to expose the seam and having central and lateral gripping portions cooperative with the portions of the support, the lateral gripping portions being vertically adjustable on the support and arms and also laterally adjustable relatively to each other and containing swiveled contact pieces.

27. A welding machine, comprising a holder for the sheets to be welded, a welding torch, and means for producing relative welding movement between the holder and the torch lengthwise of the seam, characterized by said holder being of electromagnetic character comprising a support with central and lateral portions adapted to contact with the under surfaces of the work, and arms arranged to expose the seam and to bridge the central and lateral gripping portions of the support at each side, having gripping portions cooperative therewith to clamp the sheets adjacent the seam and outwardly therefrom by electromagnetic clamping action.

28. A welding machine, comprising a holder for the sheets to be welded, a welding torch, and means for producing relative welding movement between the holder and the torch lengthwise of the seam, characterized by said holder being of electromagnetic character comprising a support with central and lateral portions adapted to contact with the under surfaces of the work, and arms arranged to expose the seam and to bridge the central and lateral gripping portions of the support at each side, having gripping portions cooperative therewith to clamp the sheets adjacent the seam and outwardly therefrom by electromagnetic clamping action, the gripping portions being adjustable to accommodate sheets of different curvatures.

JAMES L. ANDERSON.